United States Patent [19]
Helton et al.

[11] 3,831,298
[45] Aug. 27, 1974

[54] EXPANDABLE RETAINING PIN FOR TELESCOPIC PARTS

[75] Inventors: Eugene L. Helton; Loyal O. Watts, both of Peoria, Ill.

[73] Assignee: Caterpillar Tractor Co., Peoria, Ill.

[22] Filed: May 23, 1973

[21] Appl. No.: 362,916

[52] U.S. Cl............. 37/142 A, 85/67, 279/4, 285/341, 408/232
[51] Int. Cl............................................. E02f 9/28
[58] Field of Search............. 37/141, 142 R, 142 A; 269/48.1; 85/63, 65, 67, 73, 79; 285/338, 339, 341, 344; 287/114, 119; 279/2, 4; 408/713, 239, 231, 232

[56] References Cited
UNITED STATES PATENTS

| | | | |
|---|---|---|---|
| 2,004,787 | 6/1935 | Gillette | 269/48.1 X |
| 2,259,453 | 10/1941 | Beyer et al | 285/339 X |
| 2,437,426 | 3/1948 | Hess | 37/142 X |
| 2,671,371 | 3/1954 | Pesqueira | 279/4 X |
| 2,864,623 | 12/1958 | Spink | 279/4 |
| 2,901,013 | 8/1959 | Freeman | 269/48.1 X |
| 3,018,114 | 1/1962 | Hanson | 279/4 |
| 3,436,084 | 4/1969 | Courter | 285/338 X |
| 3,468,210 | 9/1969 | Watts | 37/142 A X |
| 3,494,245 | 2/1970 | Helton | 37/142 A X |
| 3,613,495 | 10/1971 | Podgursky | 85/65 |

FOREIGN PATENTS OR APPLICATIONS

| | | | |
|---|---|---|---|
| 897,568 | 3/1945 | France | 85/67 |
| 1,131,376 | 2/1957 | France | 285/339 |

*Primary Examiner*—Robert E. Pulfrey
*Assistant Examiner*—E. H. Eickholt
*Attorney, Agent, or Firm*—Phillips, Moore, Weissenberger Lempio & Strabala

[57] ABSTRACT

An expandable retaining pin to fit within coaxial bores formed through two telescopic members, comprising a cylindrical element provided with a chamber for receiving pressurized fluid and means responsive to the pressurized fluid for expanding the pin radially and urging it into tight engagement with opposite walls of the respective bores.

7 Claims, 5 Drawing Figures

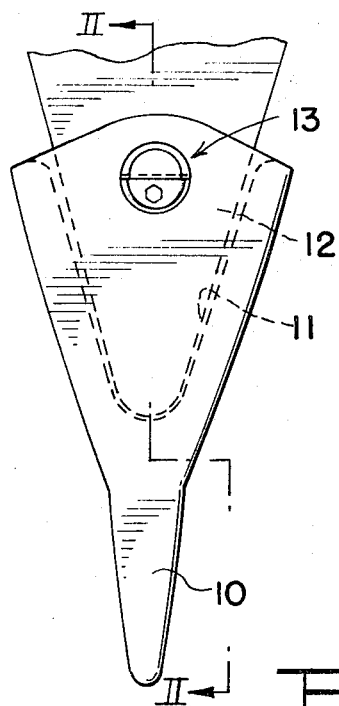
Fig_1_
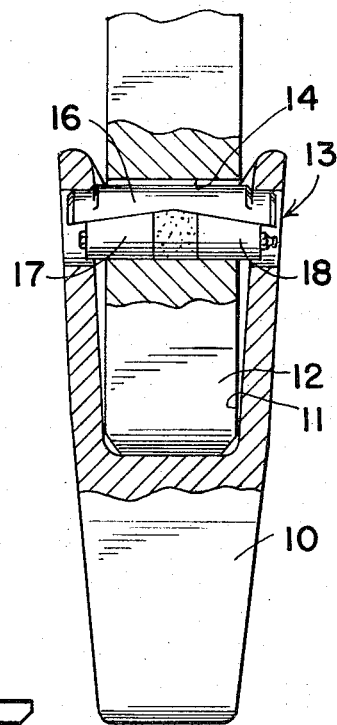
Fig_2_
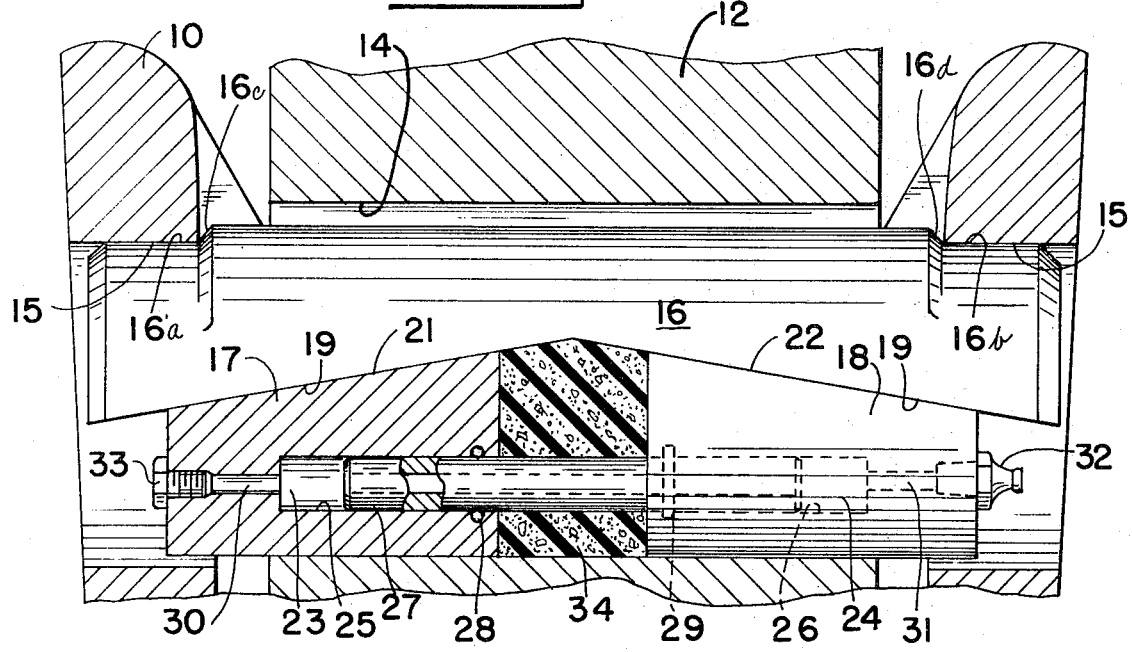
Fig_3_

3,831,298

EXPANDABLE RETAINING PIN FOR TELESCOPIC PARTS

BACKGROUND OF THE INVENTION

The present invention relates to a retaining pin for securing together two telescopic members which define coaxial bores, and pertains more particularly to a retaining pin for securing a ripper tip upon a suitable supporting shank. In such applications it is highly desirable that the ripper tip be readily replaceable on the shank since substantial wear is experienced by the tip. To meet this requirement, a retaining pin must be readily insertible as well as readily removable.

A prior art approach to attempts at providing a retaining pin embodying these features is illustrated in U.S. Pat. No. 2,994,140, issued Aug. 1, 1961 to Launder and U.S. Pat. No. 3,437,003, issued Apr. 8, 1969 to Rhoads. These patents show the use of an elastic or resilient member for holding the pin assembly in pressure engagement with at least one of the movable parts. This type of design is not completely satisfactory, however, in view of the fact that the resilient member experiences wear during repeated assembly and disassembly of the pin and must be periodically replaced if the pin is to remain usable.

Another prior art approach is given in U.S. Pat. No. 3,494,245, issued Feb. 10, 1970 to Helton. This patent shows the use of a small curved pin for holding a larger pin in pressure engagement with at least one of the movable parts. This design is also subject to wear since assembly and disassembly involve driving the larger pin over the smaller pin. Another problem with this design is the difficulty of sealing the assembly against dirt and other abrasive material.

U.S. Pat. No. 3,241,326, issued Mar. 22, 1966 to Guild et al. shows a hydraulically actuated clamp attachment for securing a pile driver to a piling. This arrangement however, would not be satisfactory for the application contemplated herein.

SUMMARY OF THE INVENTION

It is a primary object of the present invention to provide means for overcoming the previously mentioned deficiencies of the prior art.

Another object of the present invention is to provide a retaining pin which reliably secures two telescopic members in tight engagement with each other.

A further object of the present invention is to provide a retaining pin design which facilitates easy assembly and disassembly of the pin from a suitable bore without damage to the pin.

A still further object of the present invention is to provide a retaining pin design which substantially fills a suitable bore, thereby preventing dirt and the like from packing around the workable parts and interfering with the normal operation or removal of the pin.

In accordance with the present invention there is provided an expandable retaining pin for reliably securing together two telescopic parts provided with means which generally define coaxial bores, the pin comprising a cylindrical element, chamber means provided in the cylindrical element for receiving a pressurized fluid, and pressure responsive means controlled by the fluid for expanding the pin radially and urging it into tight engagement with opposite walls of at least one of the respective bores.

BRIEF DESCRIPTION OF THE DRAWINGS

The above and other objects and advantages of the present invention will become apparant from the following description when read in conjunction with the accompanying drawings wherein:

FIG. 1 is a side elevational view of a ripper tip secured upon a supporting shank by means of a retaining pin constructed in accordance with the present invention.

FIG. 2 is a view taken generally along section lines II—II of FIG. 1.

FIG. 3 is a detailed view partially in section of the pin of FIG. 2.

DETAILED DESCRIPTION OF THE PREFERRED EMBODIMENT

Figure 4:
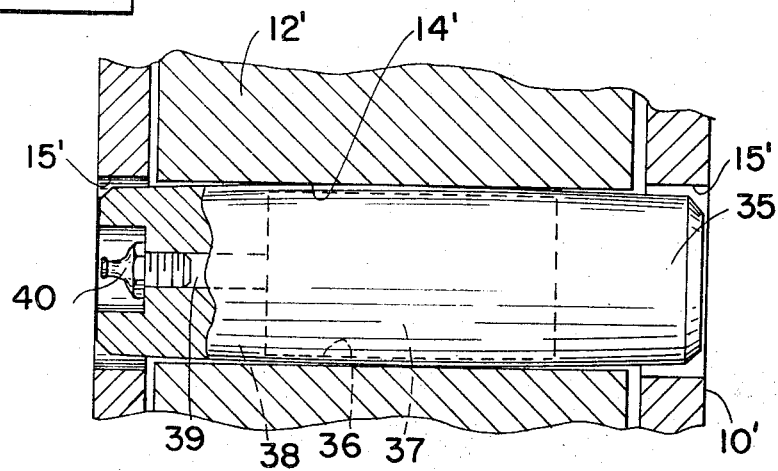
FIGS. 4 and 5 are views similar to FIG. 3 and illustrate alternate embodiments of the retaining pin shown in FIG. 3.

Referring now to the drawings and more particularly to FIG. 1, there is illustrated a wedge-shaped ripper tip 10 having a tapered socket 11 and telescopically mounted on the forward end of a similarly shaped ripper shank 12, by means of a retaining pin assembly generally indicated at 13. The pin assembly 13 is illustrated in greater detail in FIGS. 2–5.

Referring to FIG. 3, the inner telescopic member or shank 12 is provided with a generally cylindrical bore 14 while the tip 10 is provided with a pair of bores 15 which are in axial alignment with each other and in general alignment with the central bore 14 when the tip 10 is suitably mounted on the shank 12 (see FIGS. 1 and 2).

The retaining pin assembly 13 is comprised of three major components or elements 16, 17 and 18 which, upon assembly within the respective bores 15 and 14, substantially fill the central bore 14 and resist accumulation of dirt or pulverized material which might otherwise tend to prevent normal operation or disassembly of the pin assembly 13.

The major elements in the retaining pin assembly 13 comprise a substantially rigid, semicylindrical member 16 and a pair of semicylindrical wedge-shaped members 17 and 18. The rigid member 16 is provided with cam surfaces 19 and 20 having a generally sloping configuration, and extending axially and outwardly from the center of the non-cylindrical portion of member 16. The wedge-shaped members 17 and 18 have inclined surfaces 21 and 22 on the non-cylindrical portions thereof, which surfaces bear against the cam surfaces 19 and 20 of the rigid member 16. Forcing apart wedge-shaped members 18 and 19 axially along member 17 expands the pin assembly 13 radially and forces the respective opposing elements 16, 17 and 18 into tight engagement with opposite walls of the respective bores 14 and 15 thereby urging the tip 10 tightly on the shank 12.

The wedge members 17 and 18 are each provided with pressure chambers 23 and 24 defined by cylindrical bores 25 and 26 which are disposed in opposing coaxial alignment. Communication between the chambers is established by a conduit member 27 slidably disposed in the bores 25 and 26 and provided by suitable sealing means 28 and 29. Suitable conduit means 30 and 31 provide external communication with the chambers. A suitable fitting 32 such as, for example, a conventional grease fitting is provided in the outer end of one of the conduits 31. A plug 33 may be provided to close the outer end of the other conduit 30.

Axial movement of the wedge-shaped members 17 and 18 is accomplished by introducing pressurized fluid, preferably of high viscosity, such as grease, into, opposing chambers 23 and 24 by way of fitting 32 and conduit means 27, 31. The slidable conduit 27 disposed within the bores 25, 26 provides means for effecting fluid communication between the separate chambers 23 and 24 in the wedge-shaped members 17 and 18. Removal of the pin assembly 13 from the coaxial bores in the shank 12 and tip 10 is accomplished by manipulating a suitable flow control device, such as a removal of grease fitting 32 or plug 33, so that the fluid in chambers 23 and 24 is vented through conduit 30 or 31.

A suitable filler material 34, such as rubber, is placed around the slidable conduit 27 and between the wedge-shaped members 17 and 18 to prevent dirt and other pulverized material from interfering with the normal operation of the pin assembly 13.

The rigid semicylindrical member 16 may be provided with an area of reduced diameter 16a and 16b at each end thereof to provide stop shoulders 16c and 16d for abutting engagement with at least one of the members at the end of one of the bores.

Figure 5:
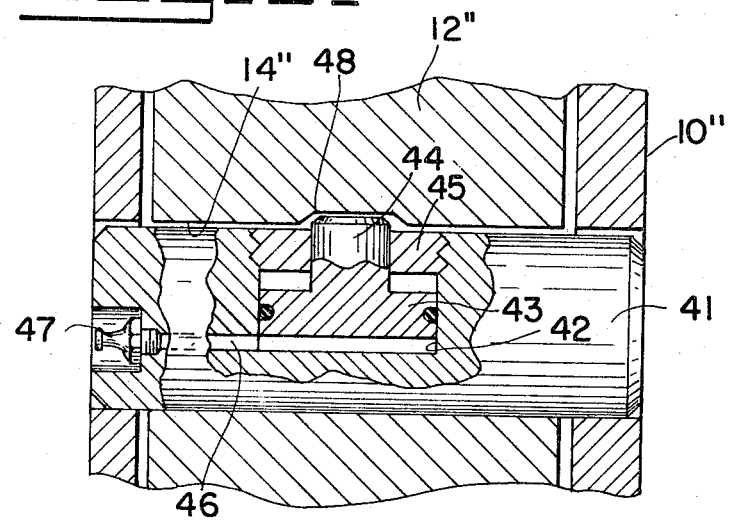

Alternate forms of the retaining pin are illustrated in FIGS. 5 and 6. In these embodiments, the retaining pin comprises a single, generally cylindrical member including means defining a centrally positioned bore or fluid chamber which is both supplied and vented by conduit means which is provided with suitable valve means.

In FIG. 4, the retaining pin comprises a generally cylindrical member 35 having a central bore 36 forming a fluid chamber 37. The bore 36 is of sufficient diameter so that the walls 38 of the cylindrical member are thin and flexible so that introduction of pressurized fluid into the chamber 37 via suitable conduit means 39 and a suitable control valve 40 (e.g. grease fitting) expands the central thin wall portion of the cylindrical member 35, causing it to frictionally engage with the bore 14' in the ripper shank 12'.

In FIG. 5, a cylindrical pin member 41 is provided with a radial bore 42, having a piston 43 including a plunger 44 reciprocally mounted therein. A cap 45 threadably engages bore 42 and retains piston 43 in place. Introduction of pressurized fluid into the bore 42 via suitable conduit means 46 and a suitable fitting 47 forces the pin 44, integrally formed with the piston, outwardly and engages it with a central groove or depression 48 in bore 14" of the ripper shank 12", thereby positively retaining the pin 41 in the aligned bores of the two members.

The retaining pin of the present invention can be employed for securing a pair of telescopic members in tight engagement with each other. The structure provided is applicable where telescopic members are joined as by a bolt or pin, and particularly when play between parts is to be eliminated. The present invention is particularly applicable for use in earthworking machinery wherein a ripper tip is releasably secured to a suitable supporting shank.

What is claimed is:

1. A releasably expandable retaining pin assembly for releasably engaging the walls of a bore, comprising:
    means defining elongated substantially cylindrical body means to be assembled in said bore;
    said body means comprising a generally rigid, elongated semi-cylindrical member having means defining camming surfaces on the non-cylindrical portion thereof, and
    a pair of generally semi-cylindrical wedge-shaped members having inclined surfaces on the non-cylindrical portions thereof, engaging the camming surfaces of said rigid member so that axial movement of the wedge-shaped members with respect to the rigid member cams the wedge-shaped members radially with respect to the rigid member;
    said rigid, semi-cylindrical member including portions of reduced diameter which form stop shoulders for engagement with at least one end of one of a pair of coaxially aligned bores;
    chamber means formed in said body means for receiving a pressurized fluid;
    means for introducing pressurized fluid into said chamber means; and,
    pressure responsive means responsive to said pressurized fluid for urging at least a portion of the pin assembly into pressure engagement with at least a part of the wall of said bore.

2. A releasably expandable retaining pin assembly for releasably engaging the walls of a bore, comprising:
    means defining elongated substantially cylindrical body means to be assembled in said bore;
    said body means comprising a generally rigid, elongated semi-cylindrical member having means defining camming surfaces on the non-cylindrical portion thereof, and
    a pair of generally semi-cylindrical wedge-shaped members having inclined surfaces on the non-cylindrical portions thereof, engaging the camming surfaces of said rigid member so that axial movement of the wedge-shaped members with respect to the rigid member cams the wedge-shaped members radially with respect to the rigid member;
    chamber means formed in said body means including a bore formed in at least one of said wedge-shaped members for receiving a pressurized fluid;
    means for introducing pressurized fluid into said chamber means;
    means for transmitting force from said pressurized fluid to the other wedge-shaped member; and,
    pressure responsive means responsive to said fluid for urging at least a portion of the pin assembly into pressure engagement with at least a part of the wall of said bore.

3. The expandable retaining pin of claim 2 including a resilient filler material positioned between said wedge-shaped members.

4. A releasably expandable retaining pin assembly for releasably engaging the walls of a bore, comprising:
    means defining elongated substantially cylindrical body means to be assembled in said bore;
    said body means comprising a generally rigid, elongated semi-cylindrical member having means defining camming surfaces on the non-cylindrical portion thereof, and
    a pair of generally semi-cylindrical wedge-shaped members having inclined surfaces on the non-cylindrical portions thereof, engaging the camming surfaces of said rigid member so that axial movement of the wedge-shaped members with respect to the rigid member cams the wedge-shaped members radially with respect to the rigid member;

chamber means formed in said body means and including a bore formed in each of said wedge-shaped members for receiving a pressurized fluid;

said bores being coaxially disposed;

means for introducing pressurized fluid into said chamber means;

conduit means reciprocally disposed in said bores to provide communication of said pressurized fluid therebetween; and, pressure responsive means responsive to said fluid for urging at least a portion of the pin assembly into pressure engagement with at least a part of the wall of said bore.

5. The retaining pin assembly of claim 4 wherein:

said pressurized fluid is a relatively incompressible highly viscous fluid; and, said means for introducing pressurized fluid into said chamber means comprises a conventional grease fitting.

6. A releasably expandable retaining pin assembly for releasably engaging the walls of a bore, comprising:

means defining elongated substantially cylindrical body means to be assembled in said bore;

said body means comprising a generally rigid, elongated semi-cylindrical member having means defining camming surfaces on the non-cylindrical portion thereof, and a pair of generally semi-cylindrical wedge-shaped members having inclined surfaces on the non-cylindrical portions thereof, engaging the camming surfaces of said rigid member so that axial movement of the wedge-shaped members with respect to the rigid member cams the wedge-shaped members radially with respect to the rigid member;

chamber means formed in said body means for receiving a pressurized fluid;

means for introducing pressurized fluid into said chamber means;

pressure responsive means responsive to said pressurized fluid for urging at least a portion of the pin assembly into pressure engagement with at least a part of the wall of said bore;

said retaining pin assembly being disposed in substantially coaxial bores formed in a pair of telescoping members having respective inner and outer telescopic portions;

said assembly being disposed in said bores so that said elongated member engages a portion of the wall of the bore of one of said telescoping members; and, said wedge-shaped members engage a portion of the wall of the bore of the other of said telescoping members.

7. The retaining pin assembly of claim 2 disposed in substantially coaxial bores formed in a pair of telescoping members having respective inner and outer telescopic portions;

said assembly being disposed in said bores so that said elongated members engage a portion of the wall of the bore of one of said telescoping member; and, said wedge shaped members engage a portion of the wall of the bore of the other of said telescoping members.

* * * * *